Patented Dec. 8, 1953

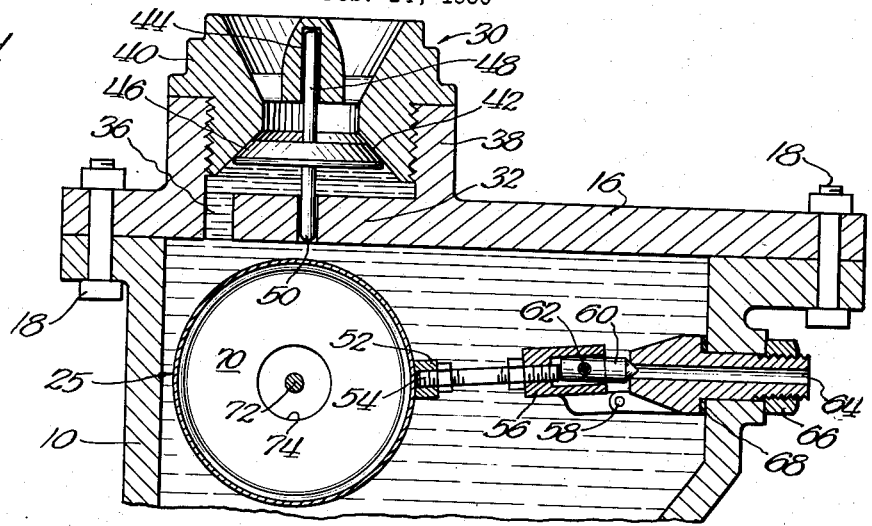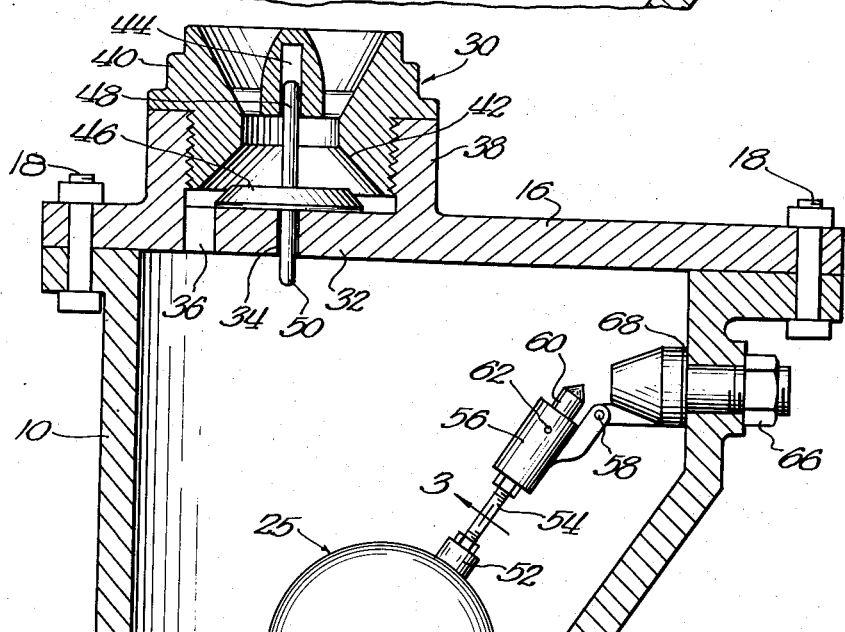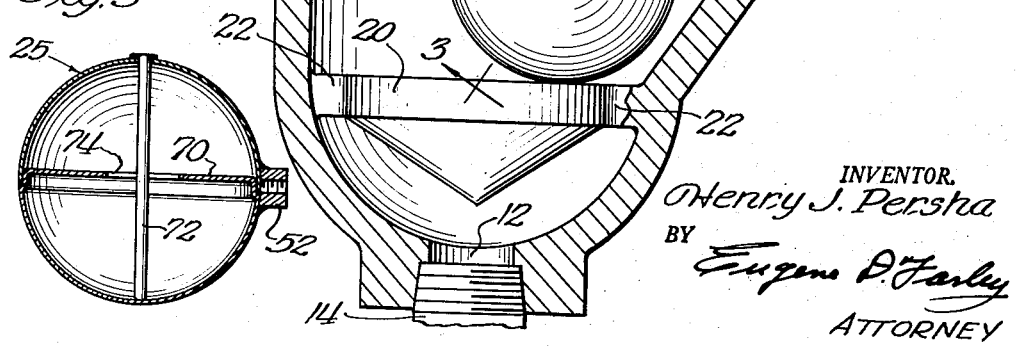

2,661,758

UNITED STATES PATENT OFFICE 2,661,758

VALVE

Henry J. Persha, Portland, Oreg.

Application February 14, 1950, Serial No. 144,150

1 Claim. (Cl. 137—202)

The present invention relates to valves used in venting gases in liquid-containing systems of the class employed generally for transporting liquids over substantial distances, e. g. water mains and pipe lines for petroleum products.

In liquid transporting systems such as the above, it is necessary that valve means be provided in the high points of the system to permit the escape of air as the system is filled with liquid. Then when the system has been filled, valve means must be provided for the collection and periodic venting of air or other gases which may gradually accumulate and interfere with the proper functioning of the system. Still further, in the event that a major break should occur, it is necessary that valve means be provided for permitting the rapid introduction of air from the exterior to prevent the collapse of the system by reason of the vacuum generated upon the removal of its liquid content. In these applications, it is convenient to apply a float activated valve, although heretofore such use has been attended by the disadvantage that the floats employed have been subject to crushing by the very heavy pressures which are encountered in the system, particularly if the float is permitted to contact a structural member during its operation, thereby denting it and initiating its collapse.

It is the primary object of the present invention to provide a single valve assembly for use in liquid systems which serves all of the above functions; i. e. that of acting as a valve for permitting the escape of large quantities of air upon filling the system, the periodic escape of minor accumulations of air during the operation of the system, and the introduction of large amounts of air into the system upon removal of the liquid content thereof.

It is a further important object of the present invention to provide a float operated valve for venting gas from liquid systems, the float acting to initiate the closing of the valve which thereafter is completed by the flow of liquid from the system.

Still another object of this invention is the provision of an indestructible float for use in valves employed in venting gas in liquid containing systems.

Still a further object of the present invention is the provision of valve means for venting gas in liquid containing systems which valve means comprises a first valve for the release of vacuum, and a second valve for the release of accumulated air, the second valve being a needle valve which is operated by the float and is self-aligning.

Still another object of the present invention is to provide a needle valve for venting gas in liquid containing systems which is self-compensating for wear over a long term of use.

The manner in which the foregoing and other objects of this invention are accomplished will be apparent from the following specification and claims considered together with the drawings wherein:

Figure 1 is a fragmentary, sectional view in elevation of the hereindescribed valve when filled with liquid;

Figure 2 is a sectional view in elevation similar to Figure 1 but illustrating the valve when empty; and Figure 3 is a detail sectional view of the float used in the presently described valve taken along the line 3—3 of Figure 2.

Referring now more particularly to the drawings, the valve assembly of the present invention comprises a casing 10 having therein a port 12 which communicates with a liquid containing system through a coupling 14 threaded thereinto. The top 16 preferably is formed as a separate member and is fastened to the body of the casing through bolts 18, 18.

Extending transversely across the casing is a baffle 20 with passageways 22 therearound. Directly above the baffle and adapted to rest upon it when the casing is filled with gas is a float 25 having for its function the actuation of the individual valves comprising the assembly. The baffle serves to direct the stream entering the casing via port 12 around float 25, and in this manner prevents the premature lifting of the float by the rapidly moving stream of entering fluid.

The first valve member, indicated generally at 30, is of substantial dimensions and serves the purpose of permitting the escape of large quantities of air or other gas when the system is filled with fluid, and of permitting the entry of large quantities of air when the liquid is drained from the system, thereby preventing the collapse of the latter. To this end, there is provided on the top plate 16 of the casing a valve supporting section 32, this being centrally perforated at 34 and having around it a passageway 36. Extending outwardly from the plate 16 is the threaded hub 38 in which is secured the nut 40. The latter is formed with a valve seat 42 and a recess 44.

Valve member 46 is stationed opposite the seat 42. Attached to it are an upper stem portion 48 which slides in recess 44, and a lower stem portion 50 which extends through perforation 34 in the valve support section 32. The lower stem portion is adapted to contact float 25 as the latter is lifted in the casing, and thus to lift valve member 46 toward the seat 42.

The second valve means comprises a needle valve associated with the float and has for its primary function the periodic release of accumulations of air or other gas during the use of the valve assembly. Attached to the float 25, as by being in threaded engagement with a projection 52 thereon, is an arm 54. As is apparent particularly from Figure 1, this arm is threaded into a housing 56 which, in turn, is pivotally attached through pin 58 to a side wall of the casing.

Within the housing 56 is the needle 60 of a needle valve, this having a transverse dimension somewhat less than that of the bore of the housing. It is secured within the housing by means of pin 62 which permits its limited oscillation.

The needle 60 is disposed opposite a port 64 extending through a sidewall of the casing 10 and provided at its inner end with a seat for receiving the tapered end of the needle. The port may be secured by any suitable means as, for example, by means of the nut 66, a gasket 68 being provided as a seal.

The elements of the needle valve are proportioned and arranged in such a manner that, when it is first placed in use, the tapered end of the needle engages the seat at a station at which the center of the float is slightly below port 64, and at which arm 54 is not aligned with the port. This misalignment of the arm is corrected, however, by the pivoting needle 60 which adjusts itself upon the application of pressure through the float 25 until it is aligned with port 64 and is securely seated in the inner end thereof. Such a construction has the important advantage of compensating for wear of the elements of the valve. As such wear occurs, the float will urge the needle further into the valve seat by an amount commensurate with the amount of wear, thereby continuing to form an efficient valve.

Since the pressures existing in fluid-conveying systems of the character described are very substantial, means are provided for preventing collapse of the float 25. In the first place, the needle valve assembly is stationed and proportioned in such a manner that the elevation of the float is arrested immediately after its contact with the stem 50 on valve member 46. As a result, the float remains a spaced distance below the inner surface of upper plate 16 and never comes in contact with it, even though the liquid continues to fill the inside of the casing. This prevents the float from striking the top plate, and hence from being dented and weakened.

In addition, the float 25 may be specially constructed to resist the great pressure exerted upon it. As is shown particularly in Figures 1 and 3, it may be provided with an annular member 70 spanning its interior and preferably disposed parallel to the direction of fluid flow within in the casing. It is in this direction that the greatest pressure is exerted upon it. Such a member has the distinct advantage over rod or bar shaped braces in that the latter tend to penetrate the side walls of the float when great pressure is exerted thereon. However, the float assembly may be further strengthened by the inclusion of a rod- or bar-shaped brace 72 which penetrates a central opening 74 in the annular reenforcing member 70 and interconnects the opposite sides of the float. This brace preferably is disposed in a direction perpendicular to the direction of fluid flow.

In operating the valve of the present invention, it is connected to a pipe line, for example a line carrying water, at a high point in the line. Water then is introduced into the system, whereupon it will fill the line and, upon reaching the valve assembly, will enter the same via port 12. It then will fill the casing 10 under great pressure but without directly impinging upon float 25, which is protected by baffle plate 20.

As the casing fills with water, however, the float therein will be lifted until it contacts stem 50 on valve member 46. The upward motion of the latter thus will be initiated by the float but continued by the rush of water into the casing. This slams shut valve 30 and maintains it closed until a vacuum is present in the line.

Upon filling of the casing with water and lifting of the float, the needle valve also is closed. The two valves then remain in closed position until they are opened by changes occurring within the system. For example, as air enters the system over a period of time, it will find its way into casing 10 where it will accumulate. When the accumulation is sufficient to lower float 25, the needle valve will be opened, whereupon the air will escape to the exterior. During this operation, valve 30 still will be held closed by the very substantial pressure existing within the casing.

However, if the system should be drained suddenly, as when a break occurs therein, the casing will be evacuated. Float 25 then will drop, opening the needle valve and, at the same time, valve member 46 will drop downwardly upon the the support section 32. This opens valve 30 and permits a sweep of air into the system, preventing its collapse.

During operation of the valve, collapse of the float 25 is prevented by reason of its being maintained out of contact with the ceiling of the casing so that it is not dented. Furthermore, it is reenforced by the plate 70 and transverse bar 72. It maintains the needle valve securely closed when elevated because the needle of the same is self-aligning and seats itself securely within port 64 even after wear has occurred.

It is to be understood that the form of my invention, herewith shown and described, is to be taken as a preferred example of the same, and that various changes in the shape, size and arrangement of parts may be resorted to, without departing from the spirit of my invention, or the scope of the subjoined claim.

Having thus described my invention, I claim:

A valve assembly for venting gas in liquid-containing system, comprising a casing communicating with the system, the casing having a vent in the upper surface thereof and a port in a side wall thereof, a float within the casing, a first valve having thereon an inwardly-extending projection, an arm attached at one of its ends to the float, a needle pivotally attached intermediate its ends to the other end of the arm for movement independent thereof, a housing rigidly secured adjacent to the needle valve end of the arm and surrounding said valve in spaced relation thereto to permit limited movement of the needle into and out of axial alignment with the port axis, pivot means interconnecting the said needle valve housing to the casing adjacent to the side wall port with the needle stationed opposite the port and adapted to open and close the same with the motion of the float, the needle acting upon initial lifting by the float to engage the port in axial misalignment and upon final lifting by the float to pivot into alignment with the port to seat itself in the port and simultaneously restrain the upward motion of the float after the said float has engaged and initially moved the projection on the first valve and prior to contact of the float with the top of the casing, the closing of the first valve thereby being initiated by contact of the projection on the same with the float, but being completed by the flow of liquid within the casing.

HENRY J. PERSHA.

References Cited in the file of this patent

UNITED STATES PATENTS

| Number | Name | Date |
|---|---|---|
| 855,659 | O'Brien | June 4, 1907 |
| 1,261,044 | McCracken | Apr. 2, 1918 |
| 2,043,892 | Halter | June 9, 1936 |
| 2,106,512 | Woolley | Jan. 25, 1938 |
| 2,199,611 | Blanchard | May 7, 1940 |